(12) United States Patent
Fu et al.

(10) Patent No.: US 8,807,149 B2
(45) Date of Patent: Aug. 19, 2014

(54) SYSTEM, METHOD AND APPARATUS FOR RECYCLING QUENCHING MEDIUM

(76) Inventors: Changzhi Fu, Luannan (CN); Yuxuan Fu, Luannan (CN)

(*) Notice: Subject to any disclaimer, the term of this patent is extended or adjusted under 35 U.S.C. 154(b) by 276 days.

(21) Appl. No.: 13/224,944

(22) Filed: Sep. 2, 2011

(65) Prior Publication Data

US 2012/0222704 A1 Sep. 6, 2012

(30) Foreign Application Priority Data

Sep. 2, 2010 (CN) .......................... 2010 1 0269545

(51) Int. Cl.
*C21D 1/62* (2006.01)
*B08B 3/10* (2006.01)
*F28D 21/00* (2006.01)
*F28C 3/08* (2006.01)
*C21D 1/64* (2006.01)
*C21D 1/607* (2006.01)

(52) U.S. Cl.
CPC ............ *C21D 1/607* (2013.01); *F28D 21/0001* (2013.01); *F28C 3/08* (2013.01); *C21D 1/64* (2013.01)
USPC ........................................... 134/109; 134/60

(58) Field of Classification Search
CPC ...... C21D 1/607; C21D 1/64; F28D 21/0001; F28C 3/08
USPC ..................................... 134/60, 109
See application file for complete search history.

(56) References Cited

U.S. PATENT DOCUMENTS

| | | | | | |
|---|---|---|---|---|---|
| 2,416,255 | A | * | 2/1947 | Griswold, Jr. et al. | 75/590 |
| 2,791,552 | A | * | 5/1957 | Homan | 202/229 |
| 2,816,828 | A | * | 12/1957 | Benedict et al. | 75/615 |
| 2,892,744 | A | * | 6/1959 | Myers | 148/631 |
| 2,975,086 | A | * | 3/1961 | Agarwal et al. | 134/18 |
| 3,303,017 | A | * | 2/1967 | Mayer et al. | 75/444 |
| 3,509,892 | A | * | 5/1970 | Macek | 137/9 |
| 3,759,703 | A | * | 9/1973 | Chong | 75/590 |
| 4,325,746 | A | * | 4/1982 | Popplewell et al. | 134/10 |
| 5,529,292 | A | * | 6/1996 | Accary et al. | 266/202 |

* cited by examiner

*Primary Examiner* — Michael Barr
*Assistant Examiner* — Benjamin L Osterhout
(74) *Attorney, Agent, or Firm* — Stites & Harbison PLLC; Cong Ding

(57) ABSTRACT

This invention is generally directed to a new metal parts quenching medium recycling apparatus. This device is composed of a heating furnace, a spray rinsing chamber, a immersion cleaning tank, a washing chamber, a liquid storage tank, a quenching chamber and a molten and mixing tank. At one side of a thermal insulation door, a liquid transportation pipeline is connected with the circulation pump that is installed in the liquid storage tank; at another side of the thermal insulation door, a pipeline that transports the spray rinsing water is connected with the spray rinsing chamber. In present invention, the recovering and recycling of quenching media is carried out automatically in the molten and mixing tank, providing a minimized workload and safely procedure to recover and recycle the quenching media. This procedure eliminates both the loss of the quenching media, and the related environmental pollution.

9 Claims, 2 Drawing Sheets

US 8,807,149 B2

SYSTEM, METHOD AND APPARATUS FOR RECYCLING QUENCHING MEDIUM

CROSS REFERENCE TO RELATED APPLICATIONS

This application claims the benefit of Peoples' Republic of China application Serial No. 201010269545.4, under 35 USC Sec 119 (a) hereby specifically incorporated by reference in its entirety.

FIELD OF INVENTION

This invention is generally directed to metal parts quenching medium recycling apparatus. More specifically, the quenching medium recycling apparatus is to use the heat released from the quenching cooling process to evaporate the spray rinsing water in the quenching medium, in order to recover and recycle the quenching medium.

BACKGROUND OF THE INVENTION

In the quenching process for shovel or other hardware that involve large amount of continuous operation, spray rising water and leaching/drip washing water converge into liquid storage tank. Over time, the concentration of quenching medium, as well as the liquid volume increase in the storage tank. In general, there are three temperature levels of liquid storage to recover the quenching medium by using temperature differential method. When the quenching medium concentration reaches a critical level, the medium will be crystallized in the bottom of storage tank. Because of the temperature difference among the levels in the liquid storage tank, medium crystals dominantly appear in in the third level of the tank that has the lowest temperature. To recover the medium crystal, the common practice is to take out the crystal from the tank manually, then dry the crystal out, in order to recycle the crystal. The disadvantage of this existing method is, first of all, large area is necessary for drying the medium crystal, and secondly, not only this manual taking out and drying process wastes human labor, also, it can be significantly interrupted by the influence of the natural environment such as unfavorable weather, limitation of space, and additionally, is can cause secondary pollution.

The temperature of the quenching medium increases along with the continuous process of production, and cooling procedure is necessary to ensure the quenching quality. The existing technique involves installing water-cooling pipe to cool down the quenching medium in the quenching tank. The disadvantages of this existing technique are: first of all, water wasting, and secondly, pipeline blockage by scale deposition, which needs to be regularly maintained and repaired to ensure the quenching quality.

SUMMARY OF THE INVENTION

This present invention is directed to a new a quenching medium recycling device for hardware. Contrary to the disadvantage of the existing techniques, the present invention provides a quenching medium recycling device with a novel structure that occupies small operating area, eliminates the water cooling process, abandons the manual work in taking out and drying the quenching medium crystal, has no secondary pollution, cools quenching medium and evaporates spraying and rinsing water at the same time, and recovers and recycles the quenching medium directly and automatically.

Following technical strategy is applied to achieve the goal of invention: metal parts quenching medium recycling apparatus. This device is composed of a heating furnace, a spray rinsing chamber, an immersion cleaning tank and a washing chamber, a liquid storage tank that is used to collect the liquid from the spray rising chamber, from the immersion cleaning tank, and from the drip washing chamber, a circulation pump in the liquid storage tank. At one side of a thermal insulated door a liquid transportation pipeline is connected with the circulation pump in the liquid storage tank; at another side of the thermal insulated door, a pipeline that transports the spray rinsing water is connected with the spray rinsing chamber. It featured that the device includes a quenching tank and a molten and mixing tank with novel function. The molten and mixing tank is positioned above the quenching tank, and the molten and mixing tank is covered with a splash guard cover, and along the two edges of the molten and mixing tank with splash guard plates. The splash guard cover and the splash guard plates are overlapped. A spray rinsing water by-pass connects the molten and mixing tank through the spray rinsing water pipeline. A electromagnetic valve in the spray rinsing water by-pass is installed to connect a temperature controller, and the temperature controller is connected with the quenching tank: the quenching medium flows into the molten and mixing tank driven by the medium circulation pump in the quenching tank through the quenching medium transportation pipeline, the medium flows away the molten and mixing tank to quenching tank through the medium back flow pipeline. The medium transportation pipeline, the medium backflow pipeline, the molten and mixing, and the quenching tanks are looped, and serve the medium recover and recycle.

Applying the above technical strategy, the present invention is different from the existing techniques. In the present invention, the quenching medium is automatically recovered and recycled from the molten and mixing tank, which is used to replace the existing method of taking out the crystal from the three temperature level storage tank, followed by drying out the crystal. The present invention not only has the advantage of small occupied area, also uses the definite amount of spray rinsing water mixing with the high temperature quenching medium (about 340° C.) in the molten and mixing tank, and after the evaporation of the spray rinsing water, the quenching medium directly merge into the medium circulation and flow back to the quenching tank, the quenching medium can therefore be recycled and reused. At the same time, the quenching medium is cooled down, the stable quenching quality can be ensured and the workload for recycling the quenching medium is minimized. Furthermore, the recovering and recycling of the medium are processed automatically in the molten and mixing tank under an enclosed structure, which provides a safe and harmless environment to the operator. In addition, no loss of the quenching medium ensures that the present device is environmental friendly.

Figure 1:
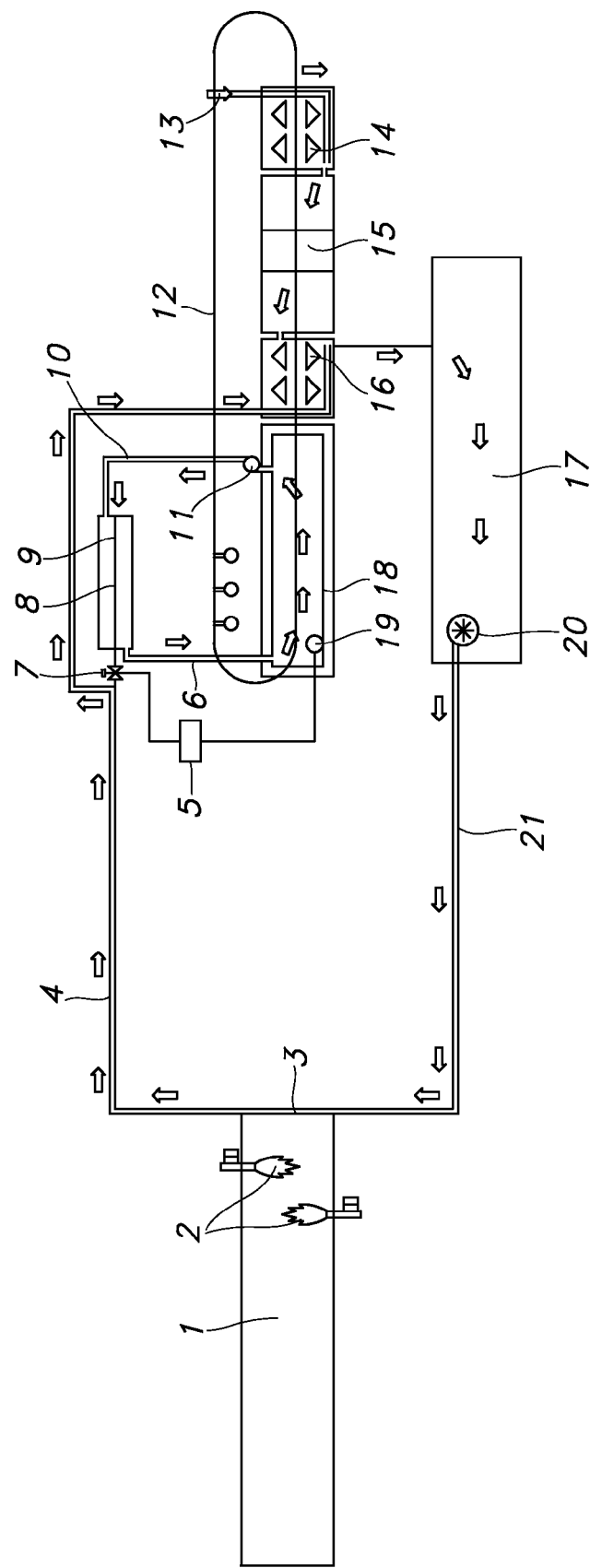
FIG. 1 is a schematic and work flow diagram of an embodiment of the metal parts quenching medium recycling apparatus of the present invention.

Elements in the figures are represented by the numbers as follows; 1—heating furnace, 2—burners, 3—thermal insulation door, 4—spray rinsing water transportation pipeline, 5—temperature controller, 6—quenching medium backflow 7—electromagnetic valve, 8—molten and mixing tank, 9—by-pass, 10—quenching medium delivery pipeline, 11—medium circulation pump, 12—automatic product delivery chain, 13—tap water pipeline, 14—rinsing chamber, 15—immersion cleaning tank, 16—spray washing chamber, 17—liquid storage tank, 18—quenching chamber, 19—thermocouples, 20—circulation pump, 21—liquid deliver pipeline, 22—stand, 23—splash guard cover, 24—splash guard plate.

DETAILED DESCRIPTION OF THE PREFERRED EMBODIMENTS

The detailed information of present invention is further described below based on the figures.

The present invention is metal parts quenching medium recycling apparatus. The preferred embodiments will apply in the production of shovels or other hardware that suits for continuous operation and requires abundant quenching. The design idea is: in order to reduce environmental pollution and medium loss during the metal quenching process, designing a novel functional molten and mixing tank 8, where the spray rinsing water is evaporated by using the heat generated from cooling the quenching medium. The preferred embodiment includes the following steps: transporting the quenching medium in the quenching tank 18 to the molten and mixing tank 8 by using the medium circulation pump 11 and medium delivery pipeline 10; the electromagnetic valve 7 in spray rinsing water by-pass 9 is turn on based on the signal from temperature controller 5, a definite amount of spray rinsing water flow into the molten and mixing tank 8 through spray rinsing by-pass 9, the inflow water merges with the quenching medium through the tile-shaped splash guard cover 23. The high temperature (around 340° C.) of the quenching medium causes water to evaporate, the remaining quenching medium is melted, and transported back to quenching chamber 18 through quenching medium backflow pipeline 6. The medium circulation pump 11 forces the quenching medium in the quenching chamber 18 to circulate in the loop between quenching chamber 18 and molten and mixing tank 8, the medium is therefore recycled.

Figure 2:
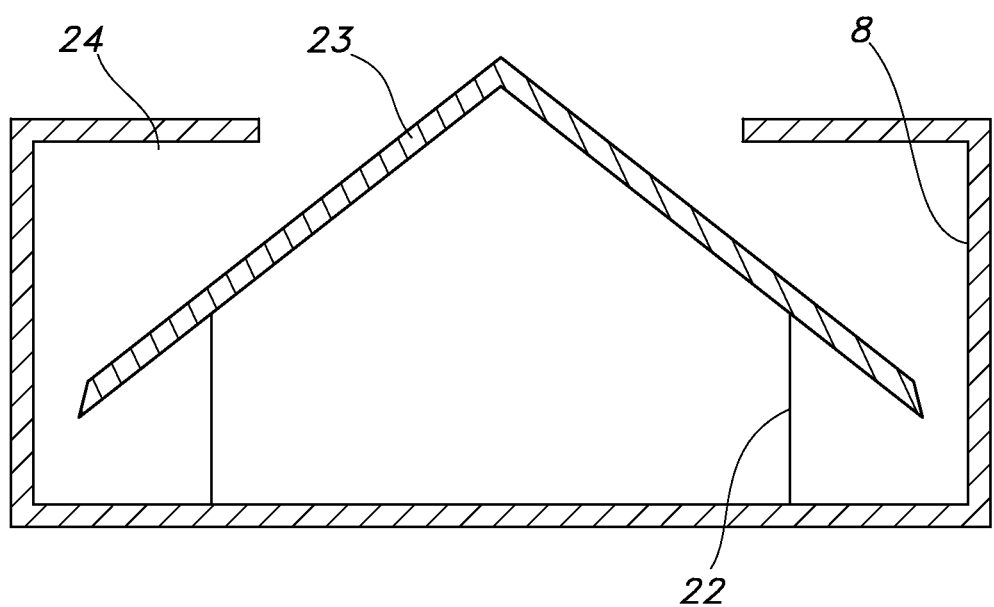
FIG. 2 is a cross-sectional view of the structure of an embodiment of a_molten and mixing tank of the present invention.

As shown in FIGS. 1 and 2, the whole device in metal products quenching includes a heating furnace 1; a spray washing chamber 16; a immersion cleaning tank 15 and a rinsing chamber 14; a liquid storage tank 17 is used to collect the liquid from the spray washing chamber 16, from the immersion cleaning tank 15, and from the rinsing chamber 14; a molten and mixing tank 8; and a quenching chamber 18. There is a circulation pump 20 in the liquid storage tank 17. There are multiple burners 2 in heating furnace 1. At one side of a thermal insulation door 3, a liquid transportation pipeline 21 is connected with the circulation pump 20 in the liquid storage tank 17; at another side of the thermal insulation door 3, a pipeline 4 that transports the spray rinsing water is connected with the spray washing chamber 16. The molten and mixing tank 8 is localized above the quenching tank 18, and the molten and mixing tank 8 is covered with a splash guard cover 23, and splash guard cover 23 is supported by a stand 22. Along the two edges of the molten and mixing tank 8, splash guard plate 24 covers the tank. The splash guard cover 23 and the splash guard plates 24 are overlapped. A spray rinsing water by-pass 9 from the spray rinsing water transportation pipeline 4 connects and inserts into the upper part of the molten and mixing tank 8. An electromagnetic valve 7 is installed in the spray rinsing water by-pass 9 and connected with a temperature controller 5 to control the inflow of the spray rinsing water. The temperature controller 5 is connected with thermoelectric couple 19 in the quenching chamber 18.

When the temperature in the quenching chamber 18 is higher than a preset limit, the temperature controller 5 catches the signal and turns on the electromagnetic valve 7 automatically. The spray rinsing water by-pass 9 delivers the water to molten and mix tank 8, and mixes with the medium there after passing the tile shaped splash guard cover 23. The quenching medium flows into the molten and mixing tank 8 driven by the medium circulation pump 20 in the quenching tank 18 through the quenching medium transportation pipeline 6, the medium flows away from the molten and mixing tank 8 to quenching chamber 18 through the quenching medium backflow pipeline 6. The medium backflow pipeline 6, the medium delivery pipeline 10, the molten and mixing tank 8, and the quenching chamber 18 compose the medium circulation loop.

The spray rinsing water transportation pipeline 4 connects with the spray washing chamber 16.

The detailed procedure of the present invention:

In the preferred embodiment, shovel is used as an example to illustrate the procedure. As shown in FIG. 1, automatic product delivery chain 12 hanging above the quenching chamber 18, the spray washing chamber 16, the immersion cleaning tank 15 and the rinsing chamber 14. A passage is built above the spray washing chamber 16 and rinsing chamber 14 to facilitate the moving of the automatic delivery chain 12. Shovels are hanged horizontally on the automatic delivery chain 12, and sent to the quenching chamber 18 which is filled with nitrate as quenching medium. The shovels are isothermally quenched at the quenching chamber 18 by using nitrate. The used nitrate in the quenching chamber 18 is pumped to the molten and mixing tank 8 by medium circulation pump 11 through medium delivery pipeline 10. When the temperature in the quenching chamber 18 is higher than a preset limit, the temperature controller 5 catches the signal and turns on the electromagnetic valve 7, the definite amount of spray and rising water transportation by-pass 9 deliver the water to molten and mixing tank 8, the water cool down the quenching medium as well as the molten and mixing tank 8, and the influx water compensates the liquid loss in the molten and mixing tank 8.

Level 1 wash: quenched shovels are then under level 1 water wash. The water heated in the thermal insulation door 3 is transported to the sprayers in the spray washing chamber 16 through water transportation pipeline 4. The shovels are under the level 1 melt spray cleaning: the hot water sprayed on the surface of the shovels, the nitrate on the surface of the shovels is quickly dissolved in the water, and the shovels are cleaned instantly. The washing water after cleaning is collected to liquid storage tank 17 through the collecting tube on the bottom of the spray washing chamber 16.

Level 2 wash: the washed shovels at spray rinsing chamber 16 are then transported by the automatic deliver chain to immersion cleaning tank 15 and are under level 2 wash. The immersion cleaning tank 15 is filled with used rinsing water, and the shovels are soaked and cleaned in the immersion cleaning tank 15 for about 3 minutes, and the surface of the shovels is washed with fresh water to dilute the coated nitrate. Then the automatic delivery chain 12 lifts the shovels up and brings the shovels to water rinsing chamber 14 for level 3 wash.

Level 3 wash: the sprayers in the rinsing chamber 14 wash the shovels finally with vaporific water. The source of the spray water comes from tap water and the spray water flows to the reverse direction to the shovels' moving direction. Because the rinsing chamber 14 is higher than the immersion washing tank 15, the used spray water flow from the bottom of rinsing chamber 14 to the immersion washing tank 15, the outflow from the immersion washing tank 15 flow to the spray washing chamber 16, and then flew to the liquid storage tank 17 through used water collecting pipe.

The liquid in the liquid storage tank 17 is pumped by the liquid circulation pump 20 to the thermal insulated door 3, then to the molten and mixing tank 8 and spray rinsing chamber 16 through spray water transportation pipeline 4, and then the liquid storage tank 17. The circulation loop started from the storage tank, and the water back to storage tank 17 driven by the pump, make the water circulation and recycle.

All the facilities and equipment are produced and arranged based on design requirements; the specification is matched with the design.

Although shovels are exampled as the preferred embodiments, the present invention is not claimed to protect shovels only. Any modified and polished, or changed design by any people in this field based on present design idea should be protected under the present invention.

The invention claimed is:

1. An apparatus for recycling liquid quenching medium, comprising:
   a quenching chamber configured to receive quenching medium,
   a spray washing chamber,
   an immersion cleaning tank,
   a rinsing chamber,
   a liquid storage tank configured to collect liquid from the spray washing chamber, wherein
   a molten and mixing tank, wherein the molten and mixing tank is located above the quenching chamber,
   a medium circulation pump located in the quenching chamber,
   a quenching medium delivery pipeline, wherein the quenching medium flows into the molten and mixing tank driven by the medium circulation pump through the quenching medium delivery pipeline, and
   a medium backflow pipeline, wherein the medium backflow pipeline transports the quenching medium from the molten and mixing tank to the quenching chamber, and wherein the medium delivery pipeline, the media backflow pipeline, the molten and mixing tank, and the quenching chamber are in fluid communication, and serve for recovering and recycling the quenching medium,
   a thermal insulation door, wherein at one side of a thermal insulation door a liquid transportation pipeline is connected with a circulation pump located in the liquid storage tank, and at another side of the thermal insulation door, a pipeline that transports the spray rinsing water is connected with the spray rinsing chamber, and
   a spray rinsing water by-pass that connects the molten and mixing tank with the spray rinsing water pipeline, wherein an electromagnetic valve in the spray rinsing water by-pass is installed to connect a temperature controller, and wherein the temperature controller is connected with the quenching chamber.

2. The apparatus of claim 1 wherein liquid flows through said apparatus by a circulation pump installed in the liquid storage tank.

3. The apparatus of claim 1 further comparing a heating furnace positioned between the quenching chamber and the molten and mixing tank.

4. The apparatus of claim 1 wherein the rinsing chamber is positioned above the spray washing chamber.

5. The apparatus of claim 1 wherein the immersion cleaning tank is positioned above the spray washing chamber.

6. The apparatus of claim 1 wherein the molten and mixing tank includes a splash guard cover supported by a stand affixed to said molten and mixing tank.

7. The apparatus of claim 6 wherein the molten and mixing tank includes a splash guard plate positioned above said molten and mixing tank.

8. The apparatus of claim 1 further comprising a heating furnace positioned between the molten and mixing tank and the quenching chamber.

9. A system to recycle a quenching medium used in the manufacture of metal parts comprising:
   a product delivery means to deliver quenching medium to a quenching chamber;
   a quenching chamber configured to receive quenching medium;
   a spray washing chamber,
   an immersion cleaning tank,
   a rinsing chamber,
   a liquid storage tank configured to collect liquid from the spray washing chamber,
   a molten and mixing tank in fluid communication with said quenching chamber, configured to receive used quenching medium and a conduit to deliver spray rinsing water to the molten and mixing tank and a temperature actuated valve to modulate flow of fluid throughout said conduit to deliver spray rinsing water to the molten and mixing tank,
   a medium circulation pump located in the quenching chamber,
   a quenching medium delivery pipeline, wherein the quenching medium flows into the molten and mixing tank driven by the medium circulation pump through the quenching medium delivery pipeline, and
   a medium backflow pipeline, wherein the medium backflow pipeline transports the quenching medium from the molten and mixing tank to the quenching chamber, and wherein the medium delivery pipeline, the media backflow pipeline, the molten and mixing tank, and the quenching chamber are in fluid communication, which serve for recovering and recycling the quenching medium,
   a thermal insulation door, wherein at one side of a thermal insulation door a liquid transportation pipeline is connected with a circulation pump located in the liquid storage tank, and at another side of the thermal insulation door, a pipeline that transports the spray rinsing water is connected with the spray rinsing chamber, and
   a spray rinsing water by-pass that connects the molten and mixing tank with the spray rinsing water pipeline, wherein an electromagnetic valve in the spray rinsing water by-pass is installed to connect a temperature controller, and wherein the temperature controller is connected with the quenching chamber.

* * * * *